(12) United States Patent
Xhakoni et al.

(10) Patent No.: US 8,792,032 B2
(45) Date of Patent: Jul. 29, 2014

(54) DYNAMIC RANGE ENHANCEMENT

(75) Inventors: Adi Xhakoni, Leuven (BE); David San Segundo Bello, Leuven (BE); Georges Gielen, Leuven (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 198 days.

(21) Appl. No.: 13/267,797

(22) Filed: Oct. 6, 2011

(65) Prior Publication Data

US 2012/0086840 A1 Apr. 12, 2012

(30) Foreign Application Priority Data

Oct. 6, 2010 (GB) .................................. 1016773.2

(51) Int. Cl.
*H04N 3/14* (2006.01)
*H04N 5/335* (2011.01)

(52) U.S. Cl.
USPC ........... 348/294; 348/298; 348/302; 348/308; 348/312

(58) Field of Classification Search
USPC ........ 348/221.1, 223.1–229.1, 362, 294–324; 250/208.1; 257/290–292
See application file for complete search history.

(56) References Cited

U.S. PATENT DOCUMENTS

| | | | |
|---|---|---|---|
| 5,793,422 | A | 8/1998 | Mochizuki et al. |
| 6,995,801 | B1 | 2/2006 | Nakakuki et al. |
| 2008/0218614 | A1* | 9/2008 | Joshi et al. ................... 348/262 |

FOREIGN PATENT DOCUMENTS

| | | |
|---|---|---|
| EP | 0583143 | 2/1994 |
| WO | WO 2009/073054 | 6/2009 |

OTHER PUBLICATIONS

Spivak et al., "Wide-Dynamic-Range CMOS Image Sensors—Comparative Performance Analysis", IEEE Transactions on Electron Devices, vol. 56, No. 11, Nov. 2009, pp. 2446-2461.
Sugawa et al., "A 100dB Dynamic Range CMOS Image Sensor using a Lateral Overflow Integration Capacitor", Solid-State Circuits Conference, Digest of Technical Papers, ISSCC 2005 IEEE International Solid-State Circuits Conference, vol. 1, Feb. 2005, pp. 352-603.
Yang et al., "A 640×512 CMOS Inage Sensor with Ultra Wide Dynamic Range Floating-Point Pixel-Level ADC", Solid-State Circuits Conference, Digest of Technical Papers, ISSCC 1999 IEEE International Solid-State Circuits Conference, 1999, pp. 308-309.

* cited by examiner

*Primary Examiner* — Yogesh Aggarwal
(74) *Attorney, Agent, or Firm* — Knobbe Martens Olson & Bear LLP

(57) ABSTRACT

A method of increasing dynamic range of pixels in an imaging sensor is disclosed. In one aspect, two image captures are performed, one at a first short integration time and one at a second optimum integration time. An electrical value obtained from a pixel or group of pixels at the first short integration time is used to predict the second integration time using a comparison with a set of reference values. The reference values relate to a saturation electrical value for each pixel or group of pixels to predict the second integration time. The first short integration time is determined as a fractional multiple of the saturation electrical value. The second integration times are such that there is no saturation of the pixel or group of pixels. Adjustments can be made to the reference values to allow for offset immunity and variability in light levels during the second integration time.

17 Claims, 6 Drawing Sheets

DYNAMIC RANGE ENHANCEMENT

BACKGROUND OF THE INVENTION

1. Field of the Invention

The disclosed technology relates to improvements in dynamic range enhancement and is more particularly concerned with dynamic range enhancement through prediction of pixel integration time.

2. Description of the Related Technology

Dynamic range (DR) is one of the most important features of imaging sensors as it provides the ability of a detector to capture highlights and shadows in the same frame. It is determined in accordance with the quality of the elements used to make the imaging sensor, that is, the quality of the pixels. In video systems, the dark-to-light contrast, in the same frame, is typically limited to between 60 and 70 dB. This range is low compared to the dark-to-light contrast that can be obtained with the human eye.

In such video systems, there is a need to have high signal-to-noise ratio (SNR) values over the whole range of operation of the pixels forming the imaging array without loss in image quality or increase in processing resources. Several methods are used to increase the dynamic range of an imaging sensor, for example, logarithmic pixel response, lateral overflow, multiple captures, etc.

Logarithmic pixel response can provide a simple pixel architecture through which high DR can be obtained. Such a method of increasing DR is described in "Wide-Dynamic-Range CMOS Image Sensors—Comparative Performance Analysis" by A Spivak, A Belenky, A Fish, and O Yadid-Pecht, Electron Devices, IEEE Transactions, pages 2446 to 2461, 2009.

However, large noise at low light and image lag are clear disadvantages which are mainly exhibited in the sub-threshold operation where the diffusion current of the transistor is dominant. Furthermore variations of fabrication process parameters increase the fixed pattern noise.

The lateral overflow method collects the charges generated by a high luminance in an extra capacitor as described by S Sugawa, N Akahane, S Adachi, K Mori, T Ishiuchi and K Mizobuchi in "A 100 dB Dynamic Range CMOS Image Sensor using a Lateral Overflow Integration Capacitor", Solid-State Circuits Conference, Digest of Technical Papers, ISSCC 2005 IEEE International, Volume 1, pages 352 to 603, 2005. This technique introduces a signal-to-noise ratio (SNR) dip at mid-light which degrades the performance of the sensor once the required DR becomes high, that is, more than 100 dB. This is due to the switching between the high conversion gain of the floating diffusion node and the low conversion gain of the lateral overflow capacitor.

A multiple captures techniques (MCT) method is described in "A 640×512 CMOS Image Sensor with Ultra Wide Dynamic Range Floating-Point Pixel-Level ADC" by D X D Yang, A El Gamal, B Fowler and Hui Tian, Solid-State Circuits Conference, Digest of Technical Papers, ISSCC 1999 IEEE International, pages 308 to 309, 1999. MCT allows wide dynamic range imaging by capturing images using different integration times and choosing the value closest to saturation. However, this technique requires a large total frame acquisition time, $T_{frame}$, which can be defined as:

$$T_{frame} = \sum_{i=1}^{n} T_{int}(i) + n(T_{AD} + T_{ro})$$

where n represents the number of captures needed for a certain DR;

$T_{int}(i)$ represents the integration time of a capture "i";

$T_{AD}$ represents the analogue-to-digital (AD) conversion time; and $T_{ro}$ represents the pixel readout time.

Furthermore, the multiple AD conversions needed per pixel, typically, one for each capture, and the image processing required to reconstruct the final image increase the overall power consumption of the imaging sensor.

In order to reduce $T_{frame}$, a dual capture technique could be used which has a DR enhancement or extension, $DR_{ext}$, defined by:

$$DR_{ext} = 20\log_{10}\left(\frac{T_{max}}{T_{min}}\right)$$

but with a SNR dip, $SNR_{dip}$, defined by:

$$SNR_{dip} = 10\log_{10}\left(\frac{T_{max}}{T_{min}}\right)$$

where $T_{max}$ represents the long capture time and $T_{min}$ represents the short capture time. However, for a dual capture process where the second capture time is chosen according to the required DR enhancement or extension, the consequent SNR dip would decrease the image quality at mid-light levels. This means that the DR enhancement or extension obtained depends on the maximum SNR dip in accordance with the specific application.

If a lower SNR dip is required, more captures with integration times within the range between $T_{min}$ and $T_{max}$ must be performed. This places a greater demand on resources with a lower frame rate and higher power consumption. For example, if an imaging sensor comprises a plurality of pixels that provide a DR of 60 dB and it is desired to increase the DR to 120 dB, ten extra captures are needed to provide a DR enhancement or extension of 60 dB, where each capture provides an extra 6 dB.

SUMMARY OF CERTAIN INVENTIVE ASPECTS

Certain inventive aspects relate to a method for extending the dynamic range of an image sensor while overcoming the disadvantages of SNR dip when using a dual capture process.

Certain inventive aspects relate to a method which makes it possible to improve the dynamic range of an imaging sensor by controlling the integration time of each pixel of the imaging sensor using a first short capture to estimate the optimal integration time for the pixel.

In accordance with a first aspect of the present invention, there is provided a method of increasing the dynamic range of at least one pixel in a pixel array, the method comprising a) determining a pixel output electrical value for each pixel after a predetermined integration time; and b) comparing the determined pixel output electrical value for each pixel with a set of reference values to determine an optimum integration time for each pixel in the pixel array; wherein process b) comprises determining the set of reference values from one of: a pixel saturation electrical value and a pixel output electrical swing value for each pixel in the pixel array.

By determining an optimum integration time, the dynamic range of each pixel in the pixel array can be extended without the necessity of having to take many captures. In one aspect, only two captures are required, that is, the capture at the predetermined integration time and the capture at the optimum integration time. This leads to a reduction in both processing time and processing power. In addition, frame rate is not substantially compromised as only two of captures need to be taken.

In one aspect, process b) further comprises the process of predicting the optimum integration time for each pixel in the pixel array in accordance with the comparison between the determined electrical value and the set of reference values.

In one aspect, process b) comprises setting the set of reference values as fractional multiples of the saturation electrical value. This means that, by knowing the nominal saturation electrical value of each pixel, it is possible to set a number of reference values which assist in the determination of the optimum integration time.

In one embodiment of the present invention, the set of reference values has values:

$$V_t(i) = V_{sat} * \left(\frac{1}{2}\right)^{i-1}$$

where $V_t(i)$ is the $i^{th}$ sub-threshold voltage within the saturation electrical value ($V_{sat}$) range.

Alternatively, process b) may comprise setting the set of reference values as fractional multiples of the pixel output electrical swing value, $V_{swing}$. In this case, the set of reference values has values:

$$V_t(i) = V_{swing} - V_{swing} * \left(\frac{1}{2}\right)^{i-1}$$

where $V_t(i)$ is the $i^{th}$ sub-threshold voltage within the output electrical swing value range.

Process a) may comprise determining the predetermined integration time in accordance with:

$$T_{int}(i) = T_{max} * \left(\frac{1}{2}\right)^{n-1}$$

where $T_{int}(i)$ is a sub-interval integration time, $T_{max}$ is the maximum integration time of a frame, and n is the number of sub-integration intervals.

This means that the optimum integration time is $T_{int}(i)$ when the electrical value ($V_{c1}$) is between $V_t(i)$ and $V_t(i+1)$, and $T_{max}$ when the electrical value ($V_{c1}$) is lower than $V_t(n)$ where n is the number of sub-integration intervals.

The method may further comprise c) estimating an offset for each pixel when the electrical value of each pixel causes the integration time thereof to be increased; and d) lowering the integration time of each pixel in accordance with the estimated offset.

Additionally, the method may further comprise the process of adjusting for variability in light values by reducing the values of the set of reference values.

After determining the optimum integration time for each pixel, the method preferably further comprises the process e) of reading out an electrical value from each pixel in accordance with the actual integration time. Process e) may comprise destructively reading out the electrical value or non-destructively reading out the electrical value.

In another embodiment of the present invention, the method further comprises performing processes a) to e) for a group of pixels within the imaging array. In this way, an optimum integration time for the group of pixels can be predicted.

BRIEF DESCRIPTION OF THE DRAWINGS

For a better understanding of the present invention, reference will now be made, by way of example only, to the accompanying drawings in which:—

DETAILED DESCRIPTION OF CERTAIN ILLUSTRATIVE EMBODIMENTS

Figure 1:
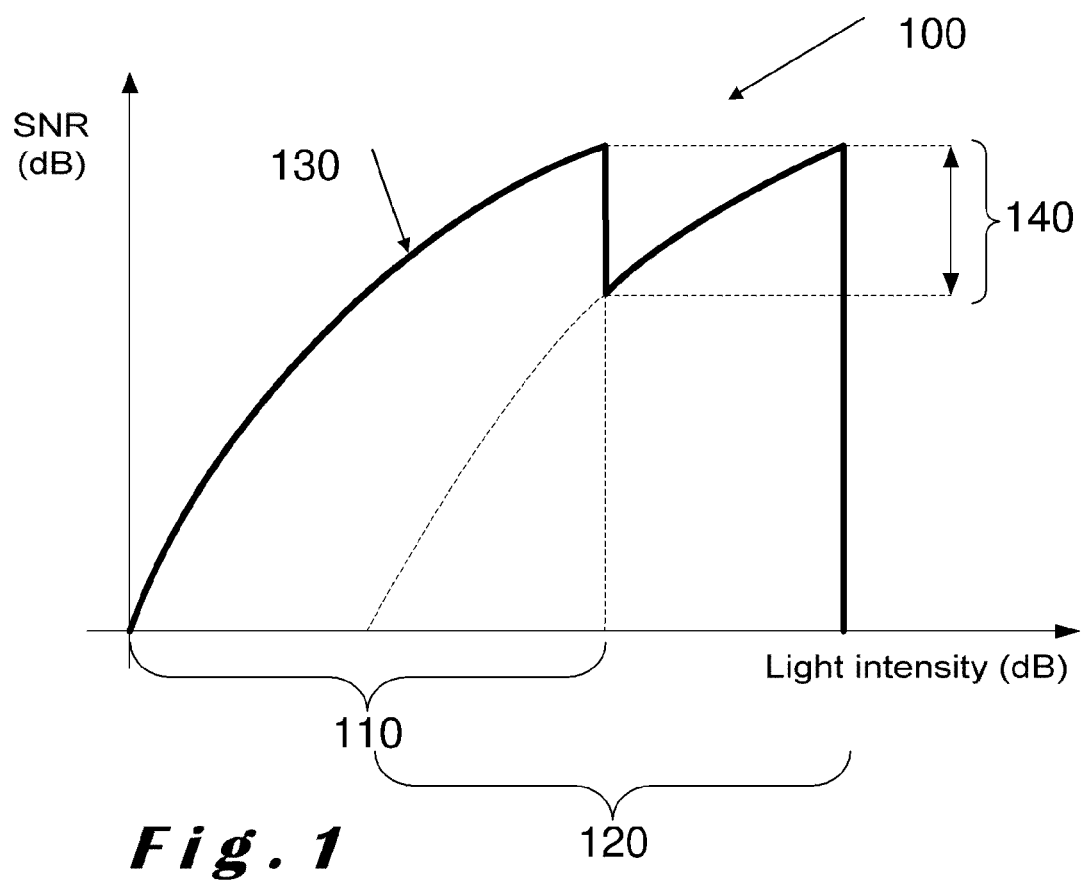
FIG. 1 illustrates a graph of a typical SNR characteristic of a conventional imaging sensor illustrating the SNR dip when DR enhancement is applied.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

It will be understood that the terms "vertical" and "horizontal" are used herein refer to particular orientations of the Figures and these terms are not limitations to the specific embodiments described herein.

In applications using imaging sensors, it is known to apply a number of threshold values to signals generated by pixels in the imaging sensor to control the operation of the particular application. U.S. Pat. No. 6,995,801 (which is incorporated herein by reference in its entirety) describes an imaging system in which the integration values are compared to upper and lower threshold values to control the imaging system. If the integration value is below the lower threshold value, an acceleration signal is generated. If the integration value is above the upper threshold value, a suppression signal is generated. If the integration value falls between the upper and lower threshold values, a fixed exposure signal is generated. The acceleration, suppression and fixed exposure signals are used to control the integration times of the imaging system.

U.S. Pat. No. 5,793,422 and EP-A-0583143 (both of which are incorporated herein by reference in their entirety) relate to electronic shutter control in video cameras. In both cases, the output of a low pass filter is compared to different threshold values to control the iris for the video camera. In EP-A-0583143, the exposure time of the imaging sensor is controlled in accordance with a comparison between an output signal corresponding to the charges generated by the imaging sensor and a number of reference levels. In U.S. Pat. No. 5,793,422, upper and lower reference levels bound a dead zone, the reference levels being controlled in accordance with the exposure time by increasing an absolute difference between the upper and lower reference levels as the exposure time decreases.

WO-A-2009/073054 (which is incorporated herein by reference in its entirety) describes an imaging device in which the light induced charge for each pixel in a row is compared against a threshold level to determine whether or not to reset the pixels in the row as a result of the comparison.

None of U.S. Pat. No. 6,995,801, U.S. Pat. No. 5,793,422, EP-A-0583143 or WO-A-2009/073054 discloses using a threshold level comparison to adjust and control the integration time of each pixel in an imaging array or imaging sensor.

In one embodiment, the core element of the method is the prediction of the optimum integration time for a single pixel or a group of pixels. For simplicity, the situation relating to a single pixel and its integration time will be described but it will readily be understood that the situation is also applicable to a group of pixels.

In one embodiment, only two captures at respective integration times are required. A first capture is made to predict the best integration time of the pixel or group of pixels. A second capture is made according to the optimum integration time predicted by the first capture. The higher the dynamic range required, the shorter the integration time needed for the first capture and the higher the advantages over the normal multiple captures technique.

The term "wide dynamic range" as used herein is defined as the ratio of the brightest point of an image to the darkest point of the same image.

The term "illuminance" as used herein is the total luminous flux incident on a surface, per unit area. It is a measure of the intensity of the incident light, wavelength-weighted by the luminosity function to correlate with human brightness perception.

Referring initially to FIG. 1, a typical SNR characteristic 100 of a sensor employing a lateral overflow technique is shown. The characteristic 100 comprises a graph of SNR against light intensity. A normal sensor characteristic 110 is shown together with a characteristic 120 due to an overflow capacitor. As shown, the two characteristics 110, 120 overlap to form a final sensor characteristic 130, as shown by the solid line, with a certain SNR dip 140 which depends on the distance between the two characteristics 110, 120. The greater the distance between the two characteristics 110, 120, the greater the DR obtained and the SNR dip.

In order to understand one embodiment of the method, the multiple captures technique (MCT) is explained first. The integration time, T, of a pixel is directly proportional to the charges it accumulates:

$$T \propto \frac{Q}{I}$$

where Q is the amount of charge accumulated and I is the illuminance.

For high values of light intensity, a short integration time is required to avoid pixel saturation, that is, the point at which the pixel has reached the maximum charge it can collect. However, a short integration time also tends to limit the charge accumulated if the light level is low. This results in low SNR or even an unrecognizable light signal. To increase the dynamic range without affecting the low light detection, a MCT can be implemented. Each integration time can be chosen to be the double of the previous one so that if the shortest integration time is $T_1$ then $T_2$ will be $2T_1$, $T_3$ will be $2T_2$, etc.

Figure 2:
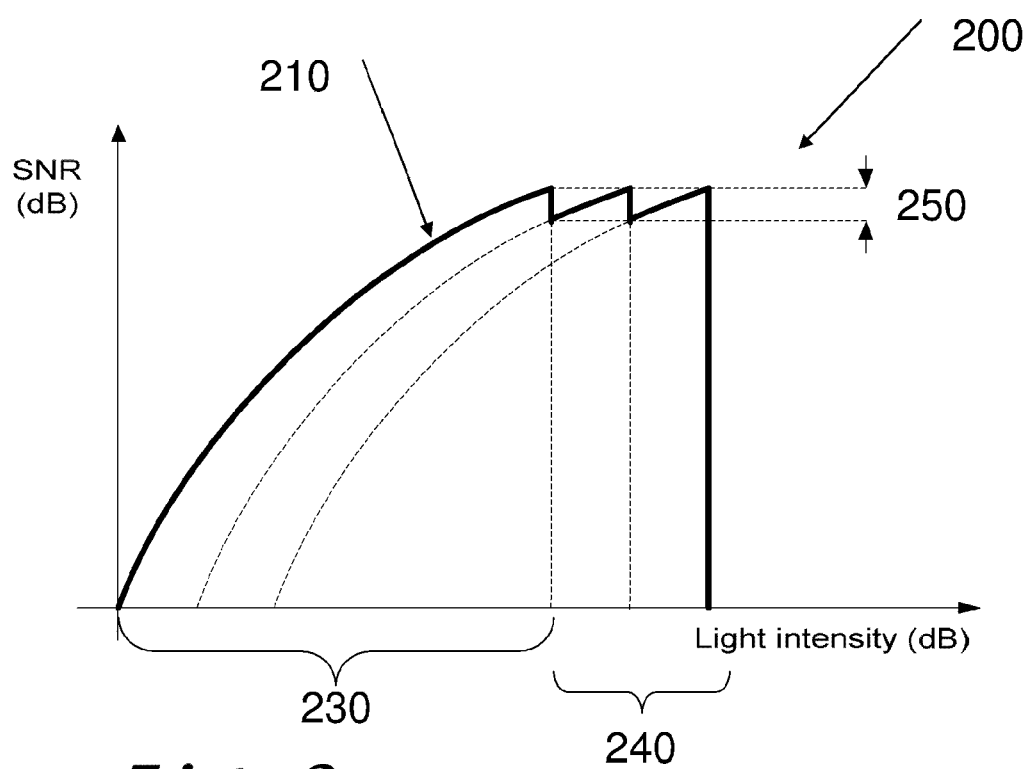
FIG. 2 is similar to FIG. 1 but showing three integration periods.

FIG. 2 illustrates the typical characteristic 200 of a sensor integrating three times. (The scale of FIG. 2 is different to that of FIG. 1.) In this example of a MCT with three captures, the final SNR characteristic 210 is obtained by the overlapping of each capture SNR characteristic, that is, the normal DR 230 and two overlapping characteristics to provide the DR extension 240. A SNR dip 250 is still obtained. If each subsequent integration time is double the previous one, the enhanced DR obtained is 6 dB per extra capture and the SNR dip is 3 dB. For simplicity, the electrical output signal of the pixels is assumed to increase as the light intensity increases.

After each integration period, the electrical value of the pixel, for example, its voltage, is compared with a reference voltage value. This reference voltage value is usually half of the full voltage range of the pixel, that is, its saturation voltage. Here, the voltage value is used as the pixel electrical value, but it will be appreciated that other representations of the pixel electrical value can be used.

If the voltage value measured is above this reference value, that is, 50% of the full range of the pixel then the voltage of the pixel and the corresponding integration time are digitized. Each capture time corresponds to a left shifting of the digitized pixel value. For example, if the resolution of an analogue-to-digital converter (ADC) is 8-bit and the number of extra captures is 10, then the virtual resolution of the pixel will be 18 bits. If the chosen integration time is $T_1$, that is, the shortest integration time, the fine pixel conversion of 8-bit is shifted left to the most significant bit. There will be, in this case, a truncation of the 10 least significant bits. This truncation does not, however, compromise the SNR of the pixel because at high light intensity values, the dominant noise is usually the photon shot noise rather than the ADC noise.

The extension of dynamic range obtained with MCT corresponds to 6 dB for each extra integration time or period. If a basic sensor provides 60 dB of DR, 10 extra captures are needed to extend the DR to 120 dB.

On the contrary, the method in accordance with one embodiment integrates only twice for each pixel. The first integration comprises a short integration time which is used to predict an optimum value for the second integration time. In order to limit the processing complexity and to reduce the number of SNR dips as shown in FIG. 2, the total integration time can be divided into sub-integration times, $T_{int}(i)$, where each $T_{int}(i)$ is chosen according to:

$$T_{int}(i) = T_{max} * \left(\frac{1}{2}\right)^{n-1}$$

with $T_{max}$ representing the maximum integration time of the frame, n is the number of captures needed for a certain DR enhancement, and "n−i" is the number of bits encoding the DR enhancement.

Figure 3:
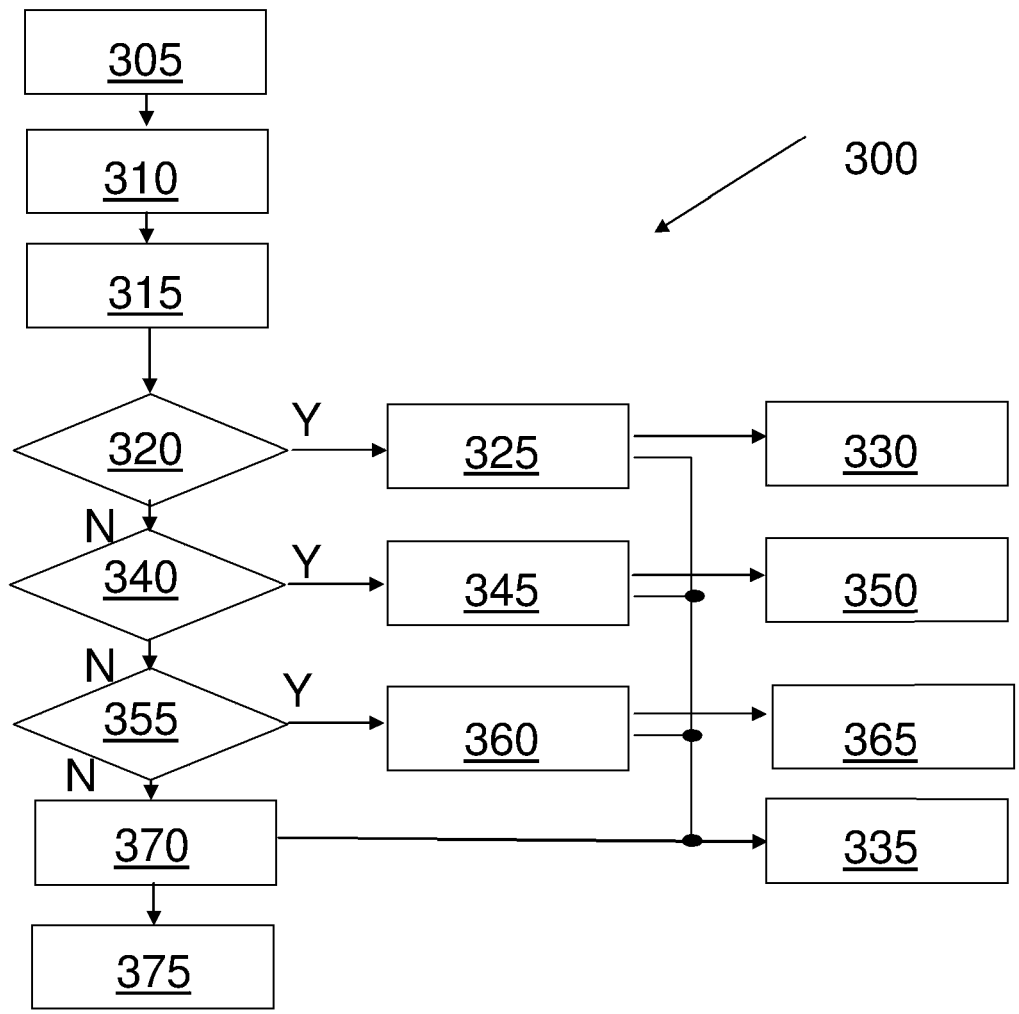
FIG. 3 illustrates a flow chart of a possible implementation of the method in accordance with one embodiment.

FIG. 3 illustrates a flow chart 300 showing an implementation of the method of DR enhancement or extension in accordance with one embodiment. The first process, process 305, is to take the first capture with the shortest integration time, $T_{int}(1)$, and to store the voltage, $V_{c1}$, relating to this first capture, process 310. The first capture is used to predict the optimum value for the second integration time. The prediction is based on the comparison of the stored voltage corresponding to the first capture, $V_{c1}$, with a reference value, $V_t(i)$, which is obtained as follows:

$$V_t(i) = V_{sat}\left(\frac{1}{2}\right)^{i-1}$$

where $V_{sat}$ represents the saturation voltage of the pixel. During a second capture, process 315, before each $T_{int}(i)$, $V_{c1}$, is compared to $V_t(i+1)$. For the first interval, $T_{int}(1)$, the comparison $V_{c1}>V_t(2)$ is made, process 320. If $V_{c1}>V_t(2)$, the capture is made at $t=T_{int}(1)$ in process 325. The voltage read is stored in a sample-and-hold (S&H) circuit, the mantissa bit is sent for storage in a digital memory in order to perform a floating point DR extension, process 330, and a "veto" signal is sent back to the pixel to avoid further integrations within the same frame.

If $V_{c1}<V_t(2)$, a second comparison is made in process 340 where $V_{c1}$ is compared to a second lower threshold value, $V_t(3)$. If $V_{c1}>V_t(3)$, a capture is made at $t=T_{int}(2)$, process 345, and the voltage read is stored in a S&H circuit, the mantissa bit is sent for storage in the digital memory, process 350, and a "veto" signal is sent back to the pixel to avoid further integrations within the same frame.

If $V_{c1}<V_t(3)$, the process is repeated until the $i^{th}$ comparison, process 355. If $V_{c1}>V_t(i+1)$, a capture is made at $t=T_{int}(i)$, process 360, and the voltage read is stored in a S&H circuit, the mantissa bit is sent for storage in the digital memory (process 365), and a "veto" signal is sent back to the pixel to avoid further integrations within the same frame.

If $V_{c1}<V_t(i+1)$, then the capture is made at $t=T_{max}$, process 370, and the voltage read is stored in a S&H circuit, the mantissa bit is sent for storage in the digital memory (process 375).

At the end of the frame, the voltage corresponding to the predicted integration time is sent for analogue-to-digital conversion (ADC) in process 335.

As an alternative to using the saturation value as the basis for the set of reference values, a pixel output electrical swing value, $V_{swing}$, can be used. In this case, $V_t(i)$ can be expressed as:

$$V_t(i) = V_{swing} - V_{swing} * \left(\frac{1}{2}\right)^{i-1}$$

Figure 4:
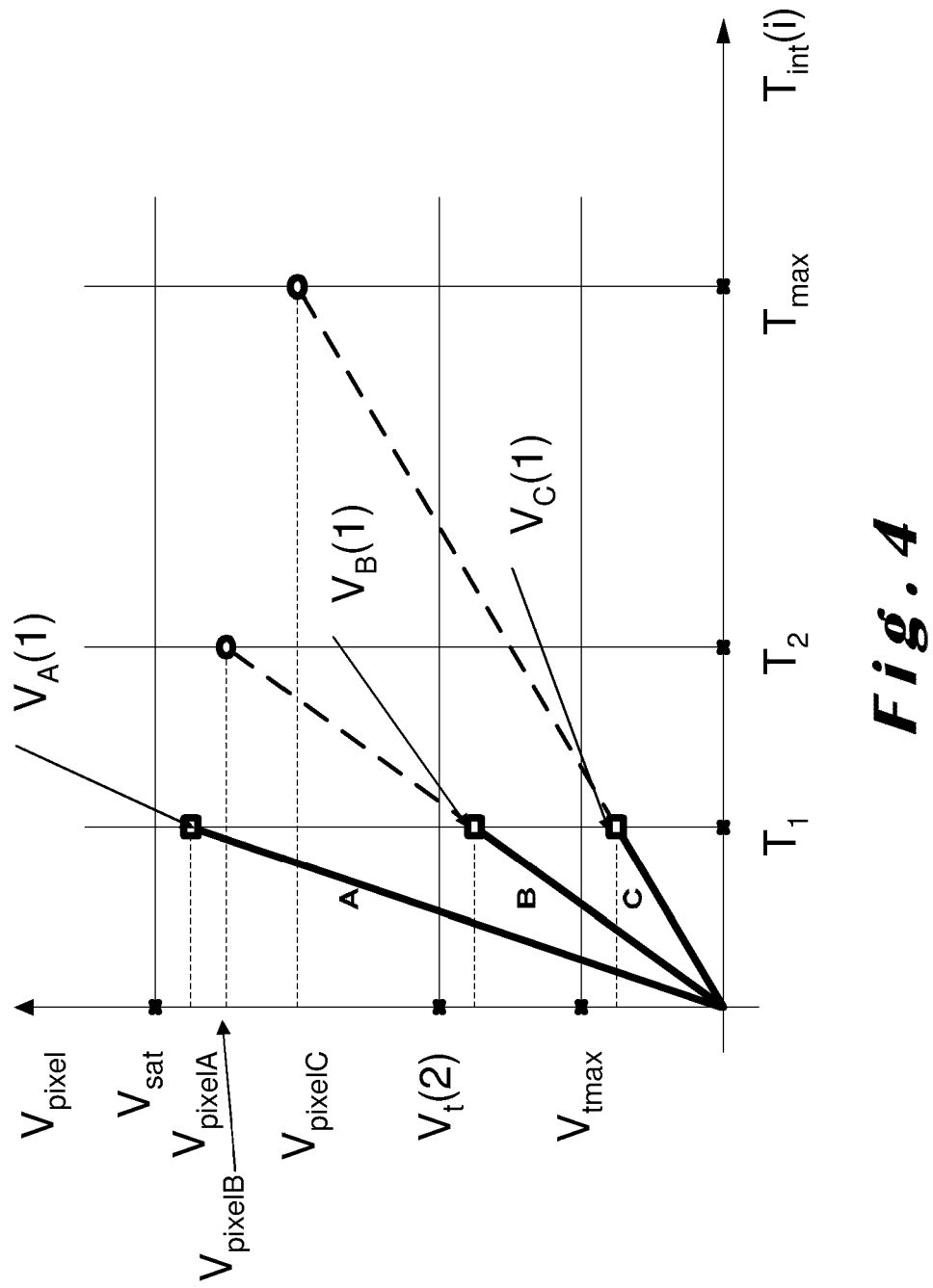
FIG. 4 illustrates a graph of pixel integration times for three pixels with different electrical output values.

FIG. 4 shows a graph of pixel voltage, $V_{pixel}$, against integration time, $T_{int}(i)$ that illustrates the process of optimum integration time prediction in three different pixels, "A", "B" and "C". For simplicity, only three reference values are used in this example resulting in a DR extension of 12 dB. (This corresponds to the requirement for three captures in MCT to obtain a DR enhancement or extension of 12 dB.) $V_{sat}$ corresponds to the saturation voltage for each of pixels "A", "B" and "C". The pixel voltages at $T_1$, the shortest capture time, are indicated by $V_A$, $V_B$ and $V_C$ respectively. $V_{pixelA}$, $V_{pixelB}$ and $V_{pixelc}$ respectively correspond to the pixel voltage at the predicted optimum integration time. As shown, for pixel "A", the optimum integration time is $T_1$; for pixel "B", $T_2$; and for pixel "C", $T_{max}$.

Here, it is assumed that the pixel saturation voltage, $V_{sat}$, which also corresponds to $V_t(1)$, is 1V. After the shortest capture time, $T_1$, the voltage of "A", $V_A(1)$, is compared to a first threshold value, $V_t(2)$, which is 50% of the saturation voltage, $V_{sat}$. In this example, $V_t(2)$ is 0.5V. As shown in FIG. 4, $V_A(1)$ is higher than $V_t(2)$, thus $T_1$ is the best integration time for "A".

In the case of "B", a first comparison is done again to 0.5V. Since the voltage of "B", $V_B(1)$, is lower than $V_t(2)$, the next reference value, $V_{tmax}$, (which corresponds to $V_t(3)$), in this case, 0.25V is tried. As $V_B(1)$ is higher than $V_{tmax}$, the best integration time for "B" is $T_2$.

For "C", a comparison is also made with $V_t(2)$ (0.5V) and $V_{tmax}$(0.25V). However, the voltage of "C", $V_C(1)$, is lower than both $V_t(2)$ and $V_{tmax}$. Therefore, the best integration time for "C" is the longest one, $T_{max}$.

If the voltage of the pixel at the time of comparison is very close to one of the reference values, noise and offset at pixel and peripheral circuitry can compromise the prediction of the best integration time. This results, in the worse case, in the choice a longer integration time than the optimum value, causing pixel saturation.

Figure 5:
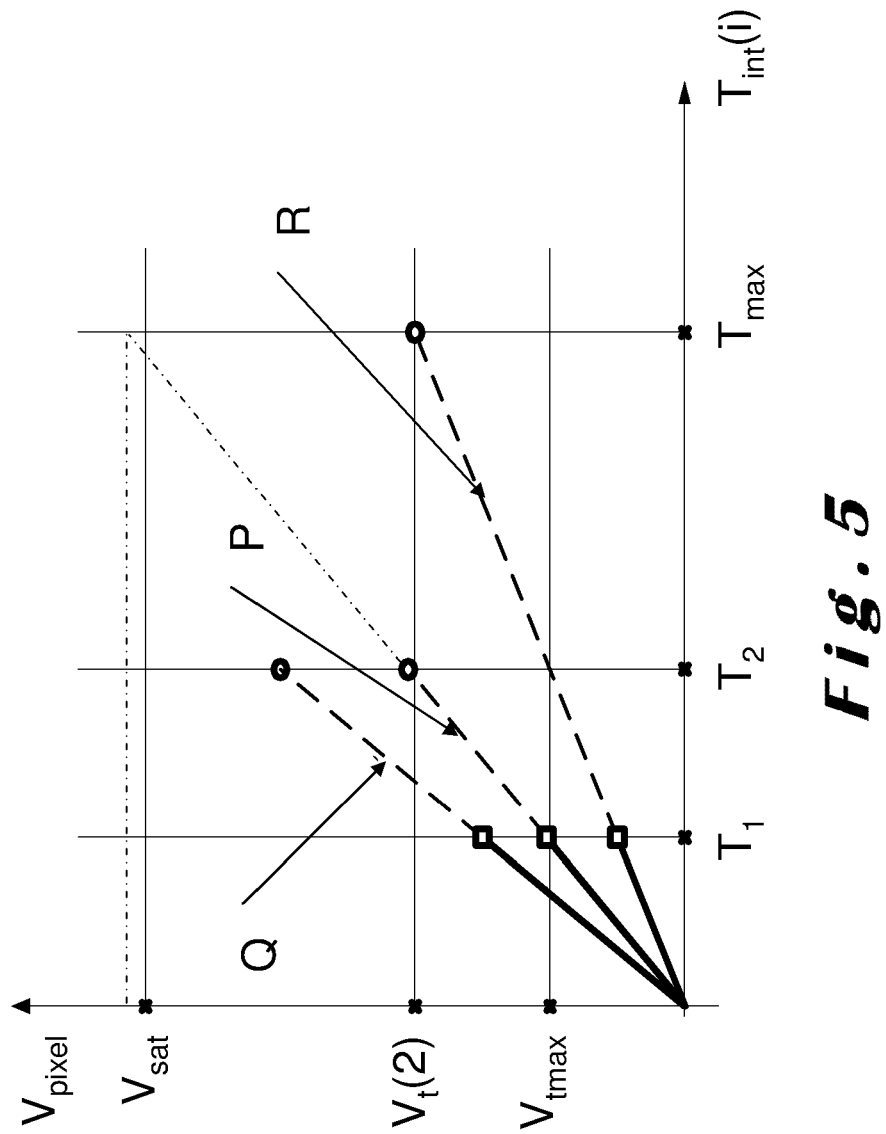
FIG. 5 is similar to FIG. 4 but illustrating the effect of offset in the prediction of the integration time.

FIG. 5 illustrates an example of a pixel with a measured voltage close to the lowest reference value, $V_{tmax}$, affected by offset. "P" represents the real value, while "Q" and "R" include the upper and lower offset levels respectively. The best integration time for "P" is $T_2$. The upper offset value, "Q", causes the choice of a lower integration time, resulting in a slight reduction of SNR, for example, a SNR loss of between 0 and 3 db. The lower offset value "R", on the contrary, can increase the predicted integration time, resulting in pixel saturation, as indicated by the dot-dash line.

In order to solve the issue of pixel offset, the pixel voltage which causes the reference value to be increased is estimated; and then the reference value is lowered by the amount of the estimated offset.

The reference values can further be decreased without decreasing the SNR considerably. For example, a 50% reduction of the lowest reference value would result in a 3 dB loss of the maximum SNR obtainable at that integration time. This is beneficial in the case of slight variability of light values during the integration period.

By using the dual capture method for DR extension or enhancement as described above, most of the advantages of MCT can be obtained, such as, linear light to voltage conversion, same SNR at low light of a conventional pixel, low SNR dips at mid- and high-light (−3 dB if each integration time is chosen to be twice that of the previous one as given above).

However, MCT needs a total integration time which is the sum of all the capture times needed for a determined DR and the relative processing times. As an example, for a pixel which requires an integration time, $T_{max}$ of 32 ms in order to detect low-light at a predetermined level, and if the DR enhancement or extension required corresponds to 30 dB, 6 extra captures are required. This results in a total integration time, $T_{frame}$, of:

$T_{max}+T_6+T_5+T_4+T_3+T_2+T_1$

This equates to a value of 63.5 ms where $T_6$ is 50% of $T_{max}$ (16 ms), $T_5$ is 25% of $T_{max}$ (8 ms), $T_4$ is 12.5% of $T_{max}$ (4 ms), $T_3$ is 6.25% of $T_{max}$ (2 ms), $T_2$ is 3.125% of $T_{max}$ (1 ms) and $T_1$ is 1.6625% of $T_{max}$ (0.5 ms). This means that if the sensor is used to capture videos, the maximum frame rate (FR) would be limited to 15.7 frames/s.

In comparison, if the method in one embodiment is used, the total integration time, $T_{frame}$, would be given by $T_{max}+T_1$, that is, 32.5 ms which corresponds to a FR of 30.7 frames/s, that is, around double the frame rate of conventional MCT.

In addition, the integration time for low-light detection is not compromised as $T_{frame} \sim T_{max}$ if the first integration time is chosen to be very small compared to the maximum integration time. Moreover, only the second capture is digitized providing substantial power reduction when compared to conventional MCT.

In one embodiment, another advantage is the drop of power consumption required as only two captures are processed instead of n captures required by MCT.

Compared to other DR extension or enhancement techniques, the advantages of the method of one embodiment reside in the fact that an almost flat SNR characteristic is obtained at mid- and high-light (SNR dips of 3 dB) without compromising the SNR at low-light.

While certain embodiments can be used with both destructive and non-destructive pixel readout systems, it is particularly useful with destructive pixel readout systems as there is a need to ensure that each pixel does not saturate in a particular frame. For non-destructive pixel readout systems, there is no need to predict as the charge on the pixels can be read without having to transfer the charge and therefore destroy the charge on each pixel.

Figure 6:
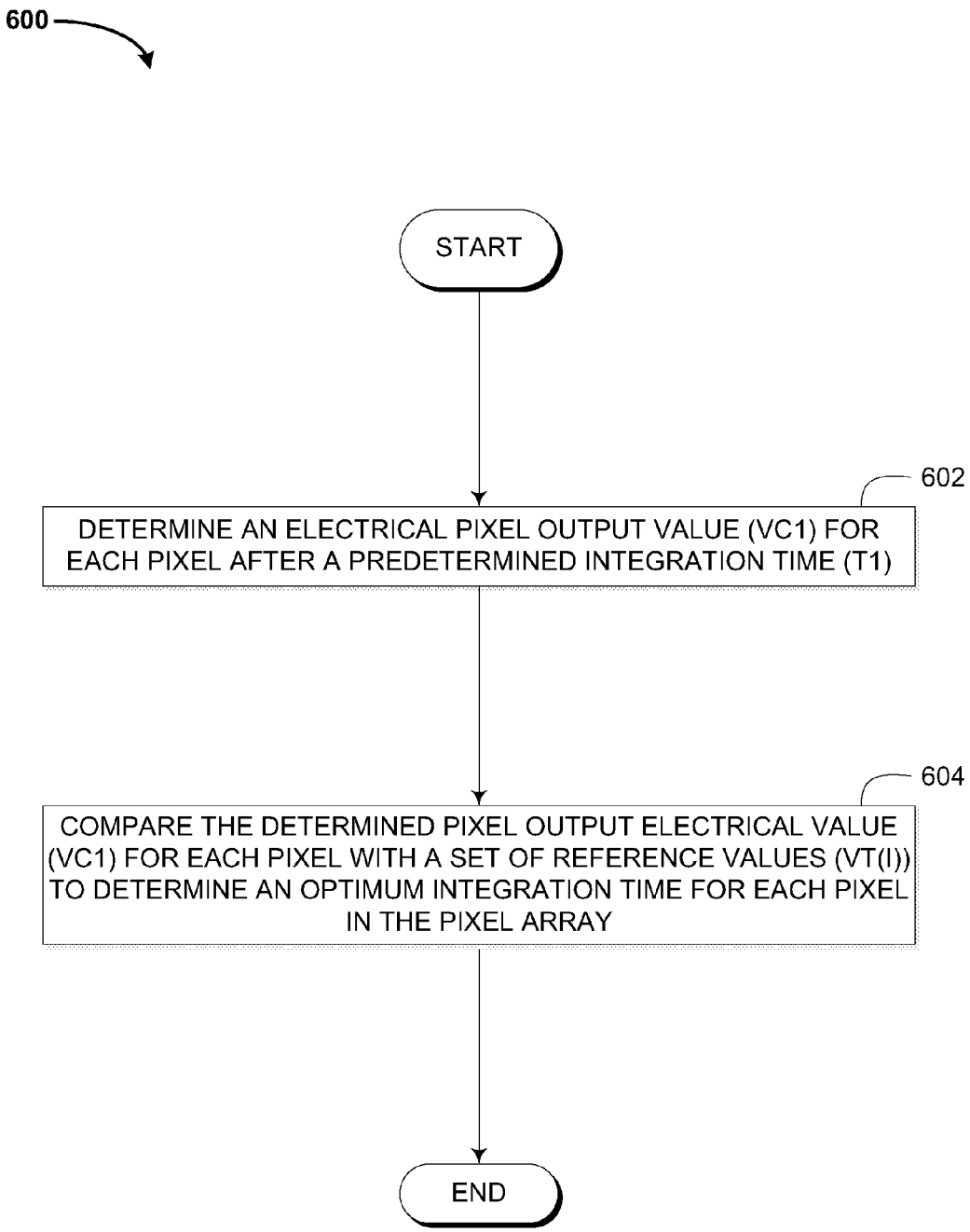
FIG. 6 shows a flowchart of one embodiment of a method of increasing the dynamic range of at least one pixel in a pixel array.

FIG. 6 shows a flowchart of one embodiment of a method of increasing the dynamic range of at least one pixel in a pixel array. The method 600 comprises at block 602 determining an electrical pixel output value (Vc1) for each pixel after a predetermined integration time (T1). The method 600 comprises, next at block 604, comparing the determined pixel output electrical value (Vc1) for each pixel with a set of reference values (Vt(i)) to determine an optimum integration time for each pixel in the pixel array. In one embodiment, the process of comparing the determined pixel output electrical value comprises determining the set of reference values (Vt(i)) from one of: a pixel saturation electrical value (Vsat) and a pixel output electrical swing value (Vswing) for each pixel in the pixel array.

Figure 7:
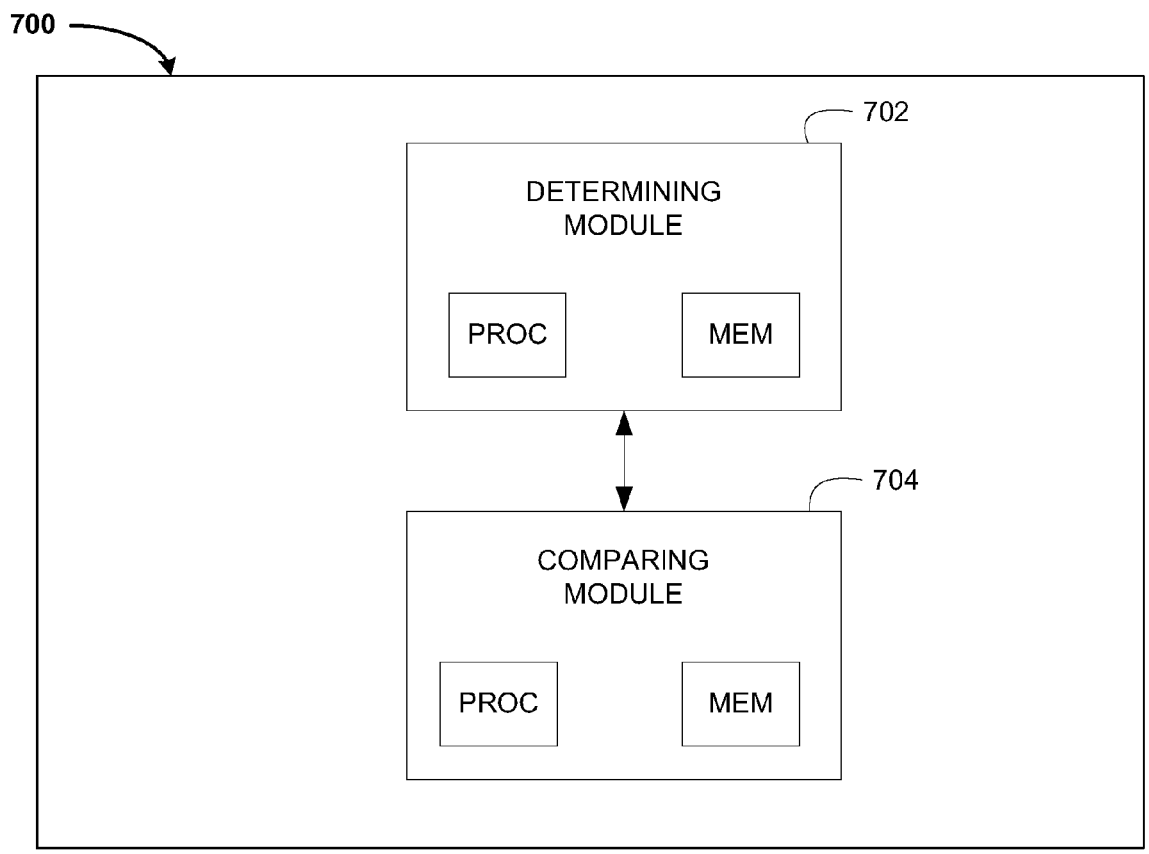
FIG. 7 shows a block diagram illustrating one embodiment of a device for increasing the dynamic range of at least one pixel in a pixel array.

FIG. 7 shows a block diagram illustrating one embodiment of a device for increasing the dynamic range of at least one pixel in a pixel array. The device 700 comprises a determining module 702 configured to determine an electrical pixel output value (Vc1) for each pixel after a predetermined integration time (T1). The device 700 may further comprise a comparing module 704 configured to compare the determined pixel output electrical value (Vc1) for each pixel with a set of reference values (Vt(i)) to determine an optimum integration time for each pixel in the pixel array. In one embodiment, the comparing module 704 may be configured to determine the set of reference values (Vt(i)) from one of: a pixel saturation electrical value (Vsat) and a pixel output electrical swing value (Vswing) for each pixel in the pixel array.

In one embodiment, the determining module 702 and/or the comparing module 704 may optionally comprise a processor and/or a memory. In another embodiment, one or more processors and/or memories may be external to one or both modules. Furthermore, a computing environment may contain a plurality of computing resources which are in data communication.

Although systems and methods as disclosed, is embodied in the form of various discrete functional blocks, the system could equally well be embodied in an arrangement in which the functions of any one or more of those blocks or indeed, all of the functions thereof, are realized, for example, by one or more appropriately programmed processors or devices.

It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. Furthermore, aspects of the invention can be implemented in a computer program product stored in a computer-readable medium for execution by a programmable processor. Method steps of aspects of the invention may be performed by a programmable processor executing instructions to perform functions of those aspects of the invention, e.g., by operating on input data and generating output data. Accordingly, the embodiment includes a computer program product which provides the functionality of any of the methods described above when executed on a computing device. Further, the embodiment includes a data carrier such as for example a CD-ROM or a diskette which stores the computer product in a machine-readable form and which executes at least one of the methods described above when executed on a computing device.

The foregoing description details certain embodiments of the disclosure. It will be appreciated, however, that no matter how detailed the foregoing appears in text, the disclosure may be practiced in many ways. It should be noted that the use of particular terminology when describing certain features or aspects of the disclosure should not be taken to imply that the terminology is being re-defined herein to be restricted to including any specific characteristics of the features or aspects of the disclosure with which that terminology is associated.

While the above detailed description has shown, described, and pointed out novel features of the disclosure as applied to various embodiments, it will be understood that various omissions, substitutions, and changes in the form and details of the device or process illustrated may be made by those skilled in the technology without departing from the scope of the disclosure. The scope of the invention is indicated by the appended claims rather than by the foregoing description. All changes which come within the meaning and range of equivalency of the claims are to be embraced within their scope.

What is claimed is:

1. A method of increasing the dynamic range of at least one pixel in a pixel array, the method comprising:
   a) determining an electrical pixel output value ($V_{c1}$) for each pixel after a predetermined integration time ($T_1$);
   b) comparing the determined pixel output electrical value ($V_{c1}$) for each pixel with a set of reference values ($V_t(i)$) to determine an optimum integration time for each pixel in the pixel array, wherein the process of comparing the determined pixel output electrical value comprises determining the set of reference values ($V_t(i)$) from one of: a pixel saturation electrical value ($V_{sat}$) and a pixel output electrical swing value ($V_{swing}$) for each pixel in the pixel array;
   c) estimating an offset for each pixel when the electrical value of each pixel causes the integration time thereof to be increased; and
   d) lowering the integration time of each pixel in accordance with the estimated offset.

2. The method according to claim 1, wherein the process b) further comprises predicting the optimum integration time for each pixel in the pixel array based on with the comparison between the determined electrical value ($V_{c1}$) and the set of reference values ($V_t(i)$).

3. The method according to claim 1, wherein the process b) comprises setting the set of reference values ($V_t(i)$) as fractional multiples of the pixel saturation electrical value ($V_{sat}$).

4. The method according to claim 3, wherein the set of reference values has values as follows:

$$V_t(i) = V_{sat} * \left(\frac{1}{2}\right)^{i-1}$$

where $V_t(i)$ is the $i^{th}$ sub-threshold voltage within the saturation electrical value ($V_{sat}$) range.

5. The method according to claim 1, wherein the process b) comprises setting the set of reference values ($V_t(i)$) as fractional multiples of the pixel output electrical swing value ($V_{swing}$).

6. The method according to claim 5, wherein the set of reference values has values as defined as follows:

$$V_t(i) = V_{swing} - V_{swing} * \left(\frac{1}{2}\right)^{i-1}$$

where $V_t(i)$ is the $i^{th}$ sub-threshold voltage within the output electrical swing value ($V_{swing}$) range.

7. The method according to claim 1, wherein the process a) comprises determining the predetermined integration time ($T_1$) in accordance with the following:

$$T_{int}(i) = T_{max} * \left(\frac{1}{2}\right)^{n-1}$$

where $T_{int}(i)$ is a sub-interval integration time, $T_{max}$ is the maximum integration time of a frame, and n is the number of sub-integration intervals.

8. The method according to claim 1, wherein the optimum integration time is $T_{int}(i)$ when the electrical value ($V_{c1}$) is between $V_t(i)$ and $V_t(i+1)$.

9. The method according to claim 1, wherein the optimum integration time is $T_{max}$ when the electrical value ($V_{c1}$) is lower than $V_t(n)$ where n is the number of sub-integration intervals.

10. The method according to claim 1, further comprising adjusting for variability in light values by reducing the values of the set of reference values ($V_t(i)$).

11. The method according to claim 1, further comprising:
e) reading out an electrical value from each pixel in accordance with the optimum integration time.

12. The method according to claim 11, wherein the process e) comprises destructively reading out the electrical value.

13. The method according to claim 11, wherein the process e) comprises non-destructively reading out the electrical value.

14. The method according to claim 11, further comprising performing processes a) to e) for a group of pixels within the pixel array.

15. A non-transitory computer-readable medium having stored therein instructions which, when executed by a processor, performs the method according to claim 1.

16. A device for increasing the dynamic range of at least one pixel in a pixel array, the device comprising:
a determining module configured to determine an electrical pixel output value ($V_{c1}$) for each pixel after a predetermined integration time ($T_1$);
a comparing module configured to compare the determined pixel output electrical value ($V_{c1}$) for each pixel with a set of reference values ($V_t(i)$) to determine an optimum integration time for each pixel in the pixel array, wherein the comparing module is further configured to determine the set of reference values ($V_t(i)$) from one of: a pixel saturation electrical value ($V_{sat}$) and a pixel output electrical swing value ($V_{swing}$) for each pixel in the pixel array;
an estimating module configured to estimate an offset for each pixel when the electrical value of each pixel causes the integration time thereof to be increased; and
a lowering module configured to lower the integration time of each pixel in accordance with the estimated offset.

17. A device for increasing the dynamic range of at least one pixel in a pixel array, the device comprising:
means for determining an electrical pixel output value ($V_{c1}$) for each pixel after a predetermined integration time ($T_1$);
means for comparing the determined pixel output electrical value ($V_{c1}$) for each pixel with a set of reference values ($V_t(i)$) to determine an optimum integration time for each pixel in the pixel array, wherein the comparing means further determines the set of reference values ($V_t(i)$) from one of: a pixel saturation electrical value ($V_{sat}$) and a pixel output electrical swing value ($V_{swing}$) for each pixel in the pixel array;
means for estimating an offset for each pixel when the electrical value of each pixel causes the integration time thereof to be increased; and
means for lowering the integration time of each pixel in accordance with the estimated offset.

* * * * *

UNITED STATES PATENT AND TRADEMARK OFFICE
CERTIFICATE OF CORRECTION

PATENT NO. : 8,792,032 B2  
APPLICATION NO. : 13/267797  
DATED : July 29, 2014  
INVENTOR(S) : Xhakoni et al.

Page 1 of 1

It is certified that error appears in the above-identified patent and that said Letters Patent is hereby corrected as shown below:

In the Specification

In column 3 at line 42 (approx.), change " $T_{int}(i) = T_{max} * \left(\frac{1}{2}\right)^{n-1}$ " to -- $T_{int}(i) = T_{max} * \left(\frac{1}{2}\right)^{n-i}$ --.

In column 6 at line 52 (approx.), change " $T_{int}(i) = T_{max} * \left(\frac{1}{2}\right)^{n-1}$ " to -- $T_{int}(i) = T_{max} * \left(\frac{1}{2}\right)^{n-i}$ --.

In the Claims

In column 11 at line 26, in Claim 7, change " $T_{int}(i) = T_{max} * \left(\frac{1}{2}\right)^{n-1}$ " to -- $T_{int}(i) = T_{max} * \left(\frac{1}{2}\right)^{n-i}$ --.

Signed and Sealed this  
Twenty-fourth Day of February, 2015

Michelle K. Lee  
*Deputy Director of the United States Patent and Trademark Office*